(12) United States Patent
Merchant et al.

(10) Patent No.: US 9,178,939 B2
(45) Date of Patent: *Nov. 3, 2015

(54) AUTO INCORPORATION OF NEW COMPONENTS INTO A HIERARCHICAL NETWORK

(71) Applicant: International Business Machines Corporation, Armonk, NY (US)

(72) Inventors: Amit Merchant, Bangalore (IN); Venkatesh Patil, Bangalore (IN); Praveen Vyas, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/309,935

(22) Filed: Jun. 20, 2014

(65) Prior Publication Data

US 2015/0178520 A1 Jun. 25, 2015

Related U.S. Application Data

(63) Continuation of application No. 14/138,222, filed on Dec. 23, 2013.

(51) Int. Cl.
*H04L 29/08* (2006.01)
*H04L 12/24* (2006.01)
*G06F 11/30* (2006.01)

(52) U.S. Cl.
CPC ............. *H04L 67/10* (2013.01); *H04L 41/08* (2013.01); *H04L 41/12* (2013.01); *H04L 41/50* (2013.01); *G06F 11/30* (2013.01)

(58) Field of Classification Search
CPC ........... G06F 7/00; G06F 15/16; G06F 17/00; G06F 17/18; G06F 17/50; G06F 19/00; G06F 11/30–11/3006; G06F 11/3048–11/3079; G06F 13/00; G06F 15/00; G06F 17/30; G06F 17/30002; H04L 12/28; H04L 41/12; H04L 41/50; H04L 67/10; H04L 7/00; H04L 41/00; H04L 41/04; H04L 41/044; H04L 41/08; H04L 41/0803; H04L 41/0809–41/0816; H04L 41/085–41/0859; G08B 21/0219
USPC .......... 709/201–205, 223–224, 226, 220, 248
See application file for complete search history.

(56) References Cited

U.S. PATENT DOCUMENTS 4,240,143 A * 12/1980 Besemer et al. ............... 710/104
5,375,167 A * 12/1994 Bales et al. ............... 379/220.01

(Continued)

FOREIGN PATENT DOCUMENTS

EP 2281179 B1 7/2012

OTHER PUBLICATIONS

"Discovering Network Connectivity Among Network Devices Based on Topological Information", an Ip.com Prior Art Database Technical Disclosure, Authors et. al.: Disclosed Anonymously, IP.com No. IPCOM000146923D, IP.com Electronic Publication: Feb. 27, 2007.

(Continued)

*Primary Examiner* — Brian J Gillis
*Assistant Examiner* — Boris Grijalva Lobos
(74) *Attorney, Agent, or Firm* — Jinesh Patel; Yeen Tham

(57) ABSTRACT

A first computing device receives one or more messages, wherein the one or more messages includes information regarding one or more components, wherein each component is part of one or more systems and wherein each system includes one or more sub systems. The first computing device determines that a first system has changed based on the first computing device comparing the one or more messages to a hierarchical model, wherein the change to the first system includes a change associated with a first component of the first system. The first computing device determines a position of the first component within the first system and within one or more sub-systems of the first system based on the one or more messages. The first computing device updates the hierarchical model to include the first component in a hierarchical location that corresponds to the determined position of the first component.

7 Claims, 3 Drawing Sheets

(56) References Cited

U.S. PATENT DOCUMENTS

| | | | |
|---|---|---|---|
| 5,941,955 A * | 8/1999 | Wilby et al. | 709/242 |
| 5,974,236 A * | 10/1999 | Sherman | 709/221 |
| 6,226,601 B1 * | 5/2001 | Longaker | 702/79 |
| 6,594,498 B1 * | 7/2003 | McKenna et al. | 455/517 |
| 7,272,518 B2 * | 9/2007 | Bickel et al. | 702/61 |
| 7,743,074 B1 * | 6/2010 | Parupudi et al. | 707/802 |
| 7,873,430 B1 * | 1/2011 | Sprecher | 700/100 |
| 8,028,045 B2 | 9/2011 | Hofmann et al. | |
| 8,050,801 B2 | 11/2011 | Richards et al. | |
| 8,078,707 B1 | 12/2011 | Watsen et al. | |
| 8,290,627 B2 | 10/2012 | Richards et al. | |
| 8,296,413 B2 | 10/2012 | Bornhoevd et al. | |
| 8,370,479 B2 | 2/2013 | Hart et al. | |
| 2003/0152098 A1 * | 8/2003 | Zhu | 370/432 |
| 2008/0089248 A1 * | 4/2008 | Ushiyama et al. | 370/256 |
| 2009/0204368 A1 * | 8/2009 | Bickel | 702/179 |
| 2010/0037189 A1 * | 2/2010 | Bickel | 716/4 |
| 2010/0094981 A1 | 4/2010 | Cordray et al. | |
| 2010/0241698 A1 | 9/2010 | Hillerbrand | |
| 2012/0177010 A1 * | 7/2012 | Huang et al. | 370/335 |

OTHER PUBLICATIONS

"Dynamic Insertion of Network Devices in Cloud Centric Networks", an Ip.com Prior Art Database Technical Disclosure, Authors et. al.: Satish Mohan, IP.com No. IPCOM000212304D, IP.com Electronic Publication: Nov. 4, 2011, Copyright 2011 Cisco Systems, Inc.
Etsi, "Machine-to-Machine communications (M2M); mla, dla and mld interfaces", ETSI TS 102 921, V1.1.1 (Feb. 2012), Technical Specification, © European Telecommunications Standards Institute 2012, <http://www.etsi.org/deliver/etsi_TS/102900_102999/102921/01.01.01_60/TS_102921v010101p.pdf>.
Merchant et al., "Auto Incorporation of New Components Into a Hierarchial Network", U.S. Appl. No. 14/138,222, filed Dec. 23, 2013.

* cited by examiner

AUTO INCORPORATION OF NEW COMPONENTS INTO A HIERARCHICAL NETWORK

CROSS REFERENCE TO RELATED APPLICATION

This application is a Continuation Application of pending U.S. patent application Ser. No. 14/138,222 filed on Dec. 23, 2013.

FIELD OF THE INVENTION

The present invention relates generally to network management, and more particularly to the dynamic incorporation of new components into a hierarchical network.

BACKGROUND

Smarter City/Information Hub solutions are designed using the model of the customer's system either explicitly using the Reference Semantic Model, or implicitly in the Intelligent Operation Center. For a water network, the model can consist of water pipers, flow meters, pumps, reservoirs, and valves. For a public surveillance system, the network is CCTVs, lobbies, rooms, and areas. Regardless of the domain, a model is assumed, and the expectation is that the model is static. Once a snapshot of the physical model is taken, it is modeled and then used for all solutions: visualization, analytics, database, and reports. However, real life is not static. Changes are occurring all the time. New flow meters may get installed and positions of old flow meters may be modified to reflect reality on the ground. New CCTV cameras may be installed. Rooms and lobbies get reconfigured. Often changes such as these are critical because the new assets are intended to plug existing deficiencies. Currently, we go through a costly and time consuming upgrade of the domain model to integrate the new assets. The customer has to seek the developers help to upgrade the model and integrate new assets. Customers who are not covered by a necessary statement of work or are beyond the time horizon of the purchase made, need to go through a new purchase order approval, and that can itself be a time consuming process.

SUMMARY

Embodiments of the present invention provide a system, method, and program product to incorporate new components into a model. A first computing device receives one or more messages, wherein the one or more messages includes information regarding one or more components, wherein each component is part of one or more systems, and wherein each system includes one or more sub systems. The first computing device determines that a first system has changed based on the first computing device comparing the one or more messages to a hierarchical model, wherein the change to the first system includes a change associated with a first component of the first system. The first computing device determines a position of the first component within the first system and within one or more sub-systems of the first system based on the one or more messages. The first computing device updates the hierarchical model to include the first component in a hierarchical location that corresponds to the determined position of the first component.

DETAILED DESCRIPTION

Figure 1:
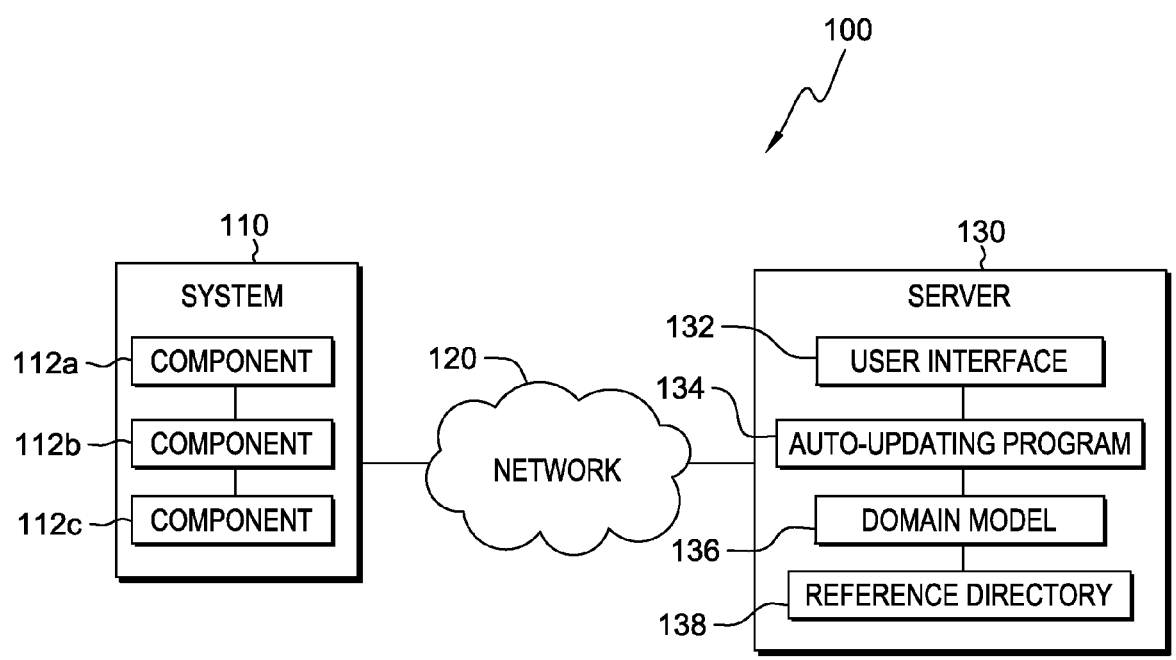
FIG. 1 is a functional block diagram illustrating the hierarchical auto-updating system in accordance with an embodiment of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code/instructions embodied thereon.

Any combination of one or more computer readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by, or in connection with, an instruction execution system, apparatus, or device.

A computer-readable signal medium may include a propagated data signal with computer-readable program code embodied therein, for example, in baseband or as part of a carrier wave. Such a propagated signal may take any of a variety of forms including, but not limited to, electro-magnetic, optical, or any suitable combination thereof. A computer-readable signal medium may be any computer-readable medium that is not a computer-readable storage medium that can communicate, propagate, or transport a program for use by, or in connection with, an instruction execution system, apparatus, or device.

Program code embodied on a computer-readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like, and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the accompanying Figures.

FIG. 1 illustrates hierarchical auto-updating system 100, in accordance with an embodiment of the present invention. In an exemplary embodiment, dynamic agent replacement system 100 includes system 110 and server 130, all interconnected via network 120.

In the exemplary embodiment, network 120 is the Internet, representing a worldwide collection of networks and gateways to support communications between devices connected to the Internet. Network 120 may include, for example, wired, wireless, or fiber optic connections. In other embodiments, network 120 may be implemented as an intranet, a local area network (LAN), or a wide area network (WAN). In general, network 120 can be any combination of connections and protocols that will support communications between system 110 and server 130.

In the exemplary embodiment, system 110 includes component 112a, component 112b, and component 112c. In the exemplary embodiment, system 110 is a system such as a water network or public surveillance system which is comprised of a plurality of components. While, in the exemplary embodiment, system 110 is depicted to include only components 112a, 112b, and 112c; in other embodiments, system 110 may include a plurality of other components. In addition, system 110 may include a central server which monitors and gathers information, such as status updates, from a plurality of components 112a, 112b, and 112c. Alternatively, system 110 may include a cluster of computing devices, working together or working separately to perform the functions of the central server, i.e., monitor and gather information from components 112a, 112b, and 112c.

In the exemplary embodiment, components 112a, 112b, and 112c are the components that make up system 110. For example, if system 110 is a water system, components 112a, 112b, and 112c may consist of the water pipes, flow meters, pumps, reservoirs and valves. In the exemplary embodiment, components 112a, 112b, and 112c are capable of communicating (i.e., receiving or transmitting information) with other computing devices, such as server 130, via network 120. The information transmitted by components 112a, 112b, and 112c to system 110 may include changes in function e.g., a malfunction or offline component notification, a notification message which may include the latitude and longitude coordinates of the component, status information, manufacturer information, specification information, or other information relevant to the component.

In the exemplary embodiment, server 130 may be a laptop computer, tablet computer, notebook computer, personal computer (PC), a desktop computer, a personal digital assistant (PDA), a smart phone, or any programmable electronic device capable of communication with system 110 via network 120. In the exemplary embodiment, server 130 includes user interface 132, auto-updating program 134, domain model 136, and reference directory 138. In addition, server 130 is capable of communicating with system 110, such as requesting and receiving information regarding the status of components 112. In other embodiments, server 130 may be capable of communicating with components 112 directly. Server 130 may include internal and external hardware components, as depicted and described in further detail with respect to FIG. 3.

In the exemplary embodiment, user interface 132 includes components used to receive input from a user of server 130 and transmit the input to auto-updating program 134 and domain model 136. User interface 132 uses a combination of technologies, such as device drivers, to provide a platform to enable users to interact with auto-updating program 134 and domain model 136.

In the exemplary embodiment, auto-updating program 134 is software capable of receiving and transmitting information to other computing devices, such as system 110, via network 120. Auto-updating program 134 is also capable of creating or updating domain model 136 based on information, such as information received from system 110 or input by a user of server 130. For example, auto-updating program 134 receives information from the components of system 110 and determines, based on the received information, whether there have been new components added to system 110 and/or if there are any problems with the components of system 110. Auto-updating program 134 is discussed in further detail with regard to FIG. 2.

In the exemplary embodiment, domain model 136 is a software model or digital representation of system 110 and describes the hierarchical location of the components of system 110, i.e., components 112a, 112b, and 112c. For example, if system 110 is a vehicle transportation and road system, a road sensor may be placed in a certain location within domain model 136 based on, for example, the city, particular zone, or specific intersection the sensor belongs to. Therefore, by way of examination of domain model 136, a user can determine the location of the road sensor within the context of one or more hierarchical categories (zone, intersections, cities, etc.). In addition, maintenance systems that monitor the components of system 110, may also refer to domain model so that the components of system 110 are monitored in an accurate fashion. The correlation between system 110 and maintenance systems that may use domain model 136 to monitor or maintain system 110 is described in further details below. In the exemplary embodiment, domain model 136 is a part of auto-updating program 134 and may be updated by auto-updating program 134 on a scheduled basis, e.g., weekly or daily.

In the exemplary embodiment, reference directory 138 contains information regarding how specific hierarchies are defined. For example, zones for water or electricity systems may be defined by geographical coordinates (latitude/longitude) and also may include the components and functions of the components that make up each system. In addition, reference directory 138 may correlate a component to a specific hierarchical location within domain model 136 based on information such as the type of component, the model of the component, the function of the component, etc. In addition, an entry in reference directory 138 may correspond to a specific component of a system, with the specific component being assigned a unique ID or identifier. For example, a component may have an associated unique identifier in the form XXX-YYY-ZZZ ZZZ, where XXX may designate a division of the component (such as a city), YYY may designate a sub-division and zone of the component, and ZZZ ZZZ may be a numerical identifier describing the device type. For example, the numerical identifier may be a number designated by the manufacturer or by a system administrator.

Figure 2:
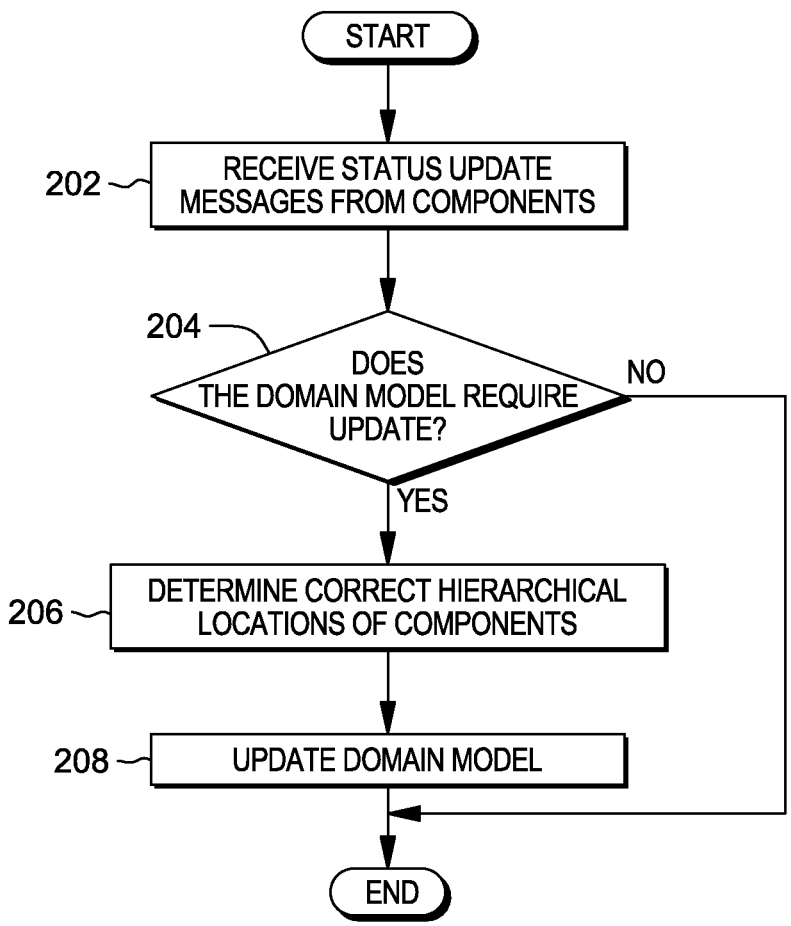
FIG. 2 is a flowchart depicting the operational steps of the hierarchical auto-updating program of FIG. 1 in updating a hierarchical domain model based on received messages and user input, in accordance with an embodiment of the present invention.

FIG. 2 is a flowchart, illustrating the operational steps of auto-updating program 134 in updating the domain model based on received messages from the components of system 110, in accordance with an embodiment of the invention. In the exemplary embodiment, auto-updating program 134 monitors system 110 and receives status update messages from components 112a, 112b, and 112c of system 110 (step 202). In the exemplary embodiment, the status update messages are received periodically from the components of system 110 (such as weekly, monthly, etc.), and may include information such as changes in function (such as a malfunction or offline component notification), notification that a connected component has been removed from system 110, and the latitude and longitude coordinates of components in system 110. For example, if auto-updating program 134 monitors a water system, and a new flow meter is added to the water system, auto-updating program 134 may receive a status update from the new flow meter indicating information about itself such as latitude/longitude, model number, specifications and/or subdivision zone that the new flow meter is located in. In addition, in one embodiment, status update messages may include a unique ID or identifier, as described above. Furthermore, in one embodiment, status update messages may include identification information which uniquely identifies the component and may also include necessary attributes of the component. In other embodiments, auto-updating program 134 may request status updates from the components of system 110 periodically and receive status updates from the components in response to the request. In further embodiments, for devices not capable of communicating status updates over a network (non-smart devices), a user of a computing device that is associated or a part of system 110 may input the status update information into the computing device via a user interface. The status update information input into the computing device may then be transmitted to server 130 periodically, or server 130 may request the status update information periodically.

Auto-updating program 134 then compares the status update messages received from components 112a, 112b, and 112c to domain model 136 to determine if there have been any changes to system 110 that require domain model 136 to be updated (decision 204). For example, referring to the example of the water system described above, if a new water flow meter comes online in system 110, auto-updating program receives status update messages periodically from the components of system 110, including the new water flow meter. Auto-updating program 134 then compares the status update messages to domain model 136 and determines that the information provided in the status update message sent by the new flow meter does not match up with a component in domain model 136. Auto-updating program 136 then determines that a new component has been added to system 110 and, therefore, a new component must also be added to domain model 136. In other embodiments, where auto-updating program 134 receives status update messages containing a unique ID or identifier for the component, such as the new water flow meter described above, auto-updating program 134 utilizes reference directory 138 and determines the type of component and the corresponding location information of the component (such as division/sub-division/zone) associated with the unique ID or identifier. For example, as described above, the unique ID may be in the following format: XXX-YYY-ZZZ ZZZ, where XXX may designate a division of the component (such as a city), YYY may designate a sub-division and zone of the component, and ZZZ ZZZ may be a numerical identifier describing the device type. Auto-updating program 134 utilizes reference directory 138 to determine the type of component that corresponds with ZZZ ZZZ, the division that corresponds to XXX, and the sub-division/zone that corresponds to YYY.

If auto-updating program 134 determines that there are no changes to system 110 that require domain model 136 to be updated (decision 204, "NO" branch), then auto-updating program 134 does not modify domain model 136.

If auto-updating program 134 determines that there have been changes to system 110 that require domain model 136 to be updated (decision 204, "YES" branch), auto-updating program 134 then determines the correct hierarchical locations of the components of system 110 (step 206). In the exemplary embodiment, auto-updating program 134 compares the status update messages with reference directory 138 in order to determine the correct hierarchical locations of the components of system 110. For example, once again referring to the example above, auto-updating program 134 utilizes the information in the status update messages received from the new flow meter to determine the hierarchical locations of the new flow meter. For instance, if reference directory 138 specifies a flow meter that is located within certain geographical coordinates (latitude/longitude) is located in zone 1 of city A, and the geographic information contained in the status update message received from the new flow meter specify a location that lies within the bounds of the certain geographical coordinates, auto-updating program 134 determines that the new flow meter belongs in a hierarchical location (such as hierarchical location one) of domain model 136 that corresponds to zone 1 of city A. In this example, the hierarchical location (hierarchical location one) may include several hierarchical categories. For example, hierarchical location may describe a first hierarchical category, such as a city, the new flow meter is located in, as well as a second hierarchical category, such as a zone within the city that the new flow meter is located in. Therefore, auto-updating program 134 may determine, based on the geographic location information for the new flow meter in the received status update message, that the new flow meter is in zone 1 (hierarchical location two) of Columbus, Ga. (hierarchical location one), and update domain model 136 accordingly. In addition, auto-updating program 134 may utilize reference directory 138 to determine that a component corresponds to a specific hierarchical location based on information such as the type of component, the model of the component, the function of the component, etc. In other embodiments, auto-updating program 134 may determine the hierarchical location of a component based on comparison of the status update messages of the component to a set of predefined rules that may be input via user interface 132 by a user or administrator of server 130. Predefined rules may include information such as a list of unique IDs or identifiers which correspond to specific components and component locations. Therefore, auto-updating program 134 may compare the unique ID information from a status update message to the list contained in the predefined rules to determine a component's hierarchical location. In this other embodiment, the predefined rules may be updated periodically or on an as needed basis by a system administrator.

Auto-updating program 134 then updates domain model 136 based on the determined correct hierarchical locations of the components of system 110 (step 208). In addition, auto-updating program 134 may determine the hierarchical location of one or more components of system 110 are incorrect based on comparison of a status update message regarding the component to reference directory 138. Auto-updating program 134 then updates domain model 136 accordingly. For example, if the location information of a component (received in a status update message) does not match the geographic location corresponding to the hierarchy (defined in reference directory 138) which the component belongs to, auto-updating program 134 may update domain model 136 by moving the component into the correct hierarchical location, as defined by reference directory 138. In other words, if auto-updating program 134 receives a status update message from component 112a which indicates that the location of the component is zone 21 but domain model 136 shows the location of component 112a as zone 25, auto-updating program 134 updates domain model 136 to reflect the location of component 112a (zone 21) as described in the received status update message.

Once domain model 136 is updated, maintenance systems associated with system 110 will be able to refer to domain model so that system 110 can be maintained and managed in the most accurate fashion. For example, referring to the example above, with a new flow meter being added to a water system, several maintenance systems may be associated with system 110 (the water system) such as hydraulic systems for maintaining water pressure, advanced asset maintenance systems for keeping track of when a component of system 110 is due for maintenance, and a SCADA (supervisory control and data acquisition) system that acquires readings from flow meters, pressure gauges, and similar components. Each of these maintenance systems references domain model 136 in order to determine which components to monitor or gather information from. For example, if a new flow meter is added to a specific zone/location and domain model 136 is updated to reflect that, a SCADA system assigned to monitor and take readings from flow meters in that zone will be aware of the presence of the new flow meter by referring to the updated domain model 136.

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention, as defined by the accompanying claims.

Figure 3:
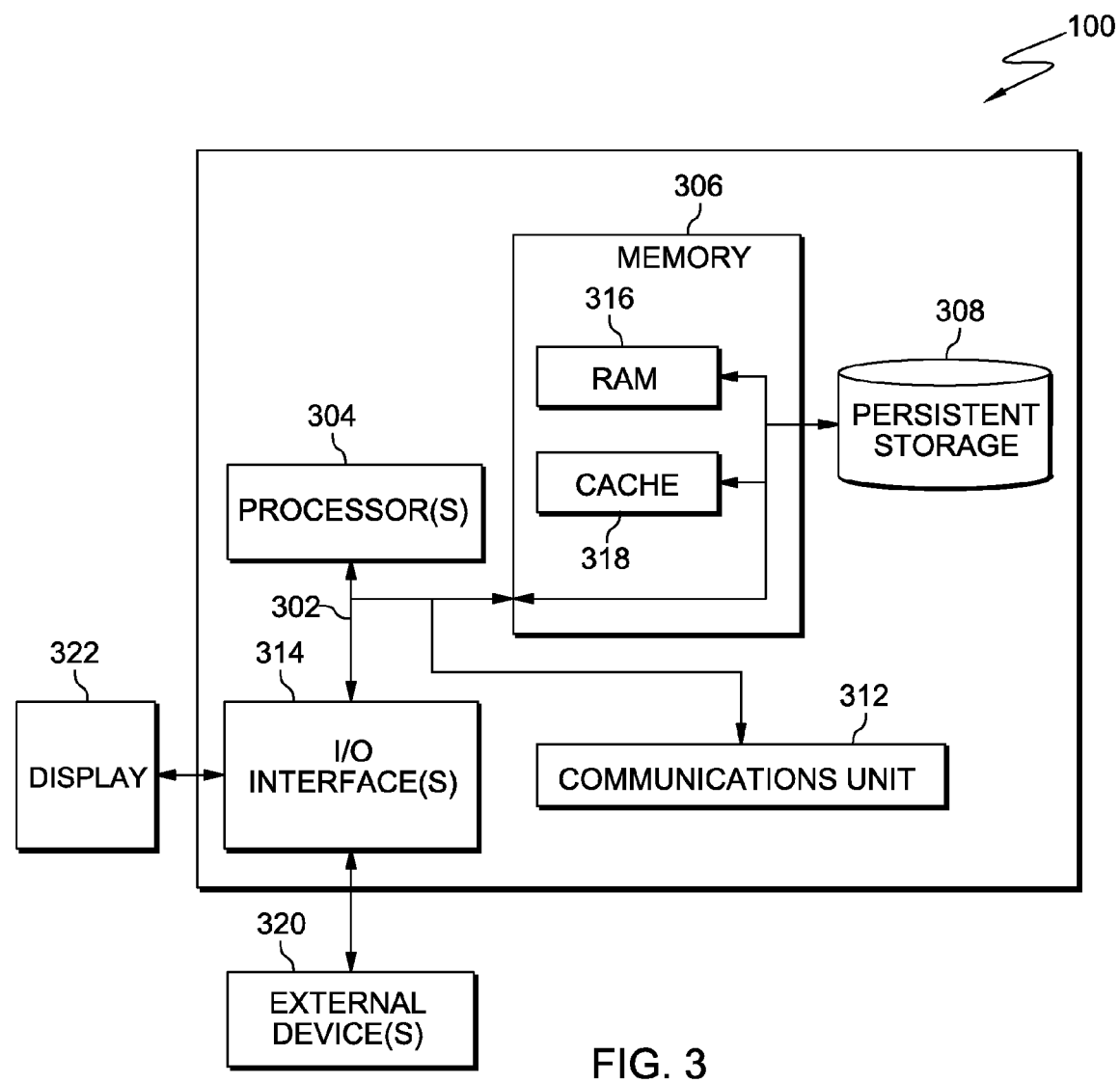
FIG. 3 is a block diagram depicting the hardware components of the auto-updating program of FIG. 1, in accordance with an embodiment of the invention.

FIG. 3 depicts a block diagram of respective components of server 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 130 includes respective communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs auto-updating 134, user interface 132, domain model 136, and reference directory 138 stored in server 130 is stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs auto-updating 134, user interface 132, domain model 136, and reference directory 138 in server 130 may be downloaded to persistent storage 308 through communications unit 312.

I/O interface(s) 314 allows for input and output of data with other devices that may be connected to server 130. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., the programs auto-updating 134, user interface 132, domain model 136, and reference directory 138 in server 130, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and, thus, the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for incorporation of new components into a hierarchical model, comprising the steps of:
    a first computing device receiving one or more messages, wherein the one or more messages includes information regarding one or more components, wherein each component of the one or more components is part of one or more systems and wherein each system of the one or more systems includes one or more sub systems, and wherein each of the one or more messages contains a unique ID, and wherein the first computing device cross-references each unique ID with a database to determine a type of component and corresponding location information of a component of the one or more components corresponding to each of the one or more messages;
    the first computing device determining that a first system of the one or more systems has changed based on the first computing device comparing the one or more messages to a hierarchical model, wherein the change to the first system includes a change associated with a first component of the first system;
    the first computing device determining the first component has moved from a first position to a second position within the first system and within one or more sub-systems of the first system based on the one or more messages; and
    the first computing device updating the hierarchical model to include the first component in a hierarchical location that corresponds to the second position.

2. The method of claim 1, wherein the change to the first system includes the first component being added to the first system.

3. The method of claim 1, wherein the change to the first system includes a change to the position of the first component within the first system and within one or more sub-systems of the first system.

4. The method of claim 1, wherein the one or more messages include geographic information regarding one or more components.

5. The method of claim 4, wherein the step of the first computing device determining the position of the first component further comprises the first computing device comparing the one or more received messages to a reference directory, wherein the reference directory correlates geographic information of one or more components to a position within one or more systems and within one or more sub-systems.

6. The method of claim 4, wherein the step of the first computing device determining the position of the first component further comprises the first computing device comparing the one or more received messages to a set of predefined business rules, wherein the set of predefined business rules correlates unique identifiers associated with each of the one or more components to a position within one or more systems and within one or more sub-systems.

7. The method of claim 1, further comprising:
    a second computing device determining hierarchical locations of components of the first system by referring to the hierarchical model; and
    the second computing device monitoring the components of the first system.

* * * * *